United States Patent Office 3,122,989
Patented Mar. 3, 1964

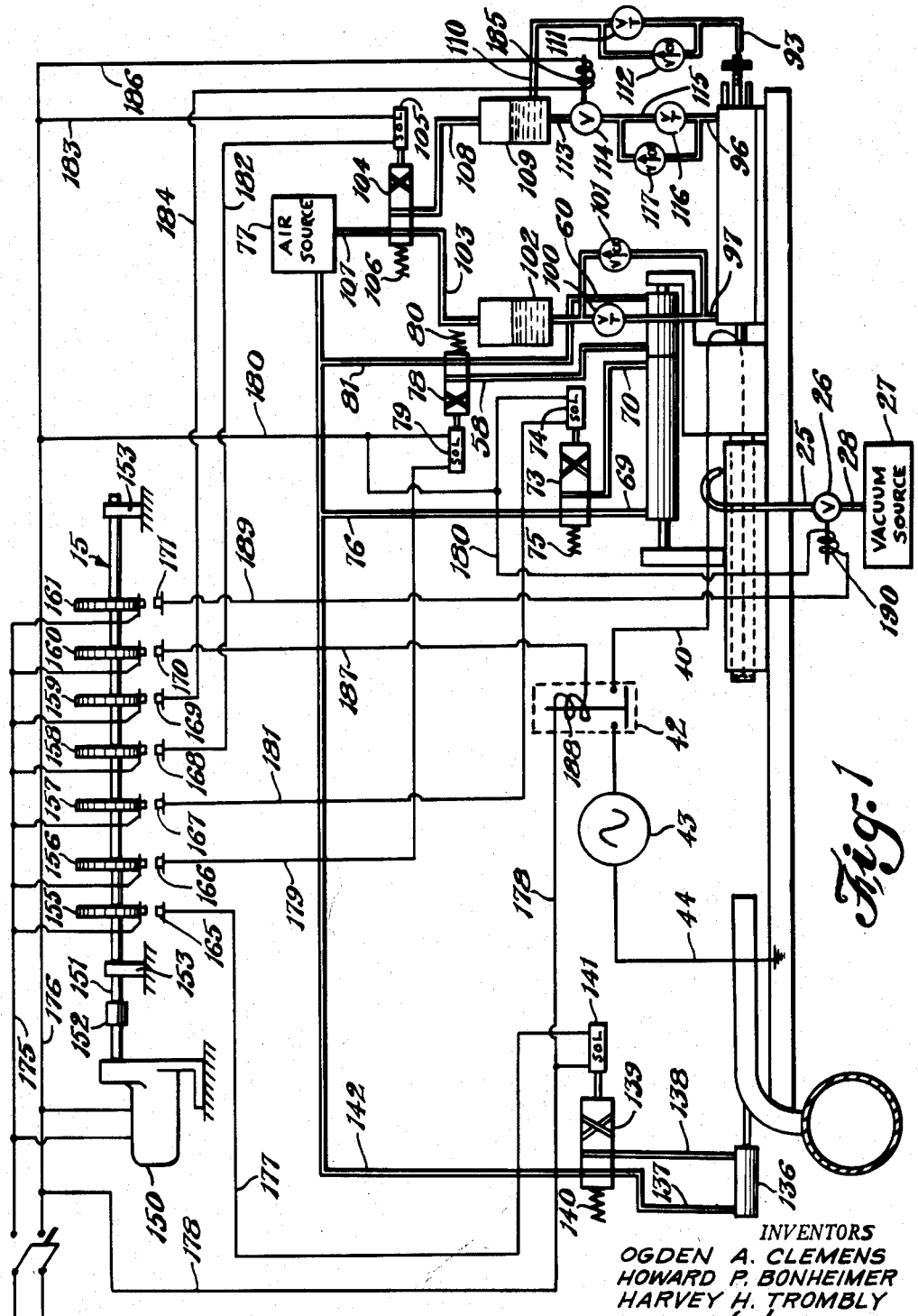

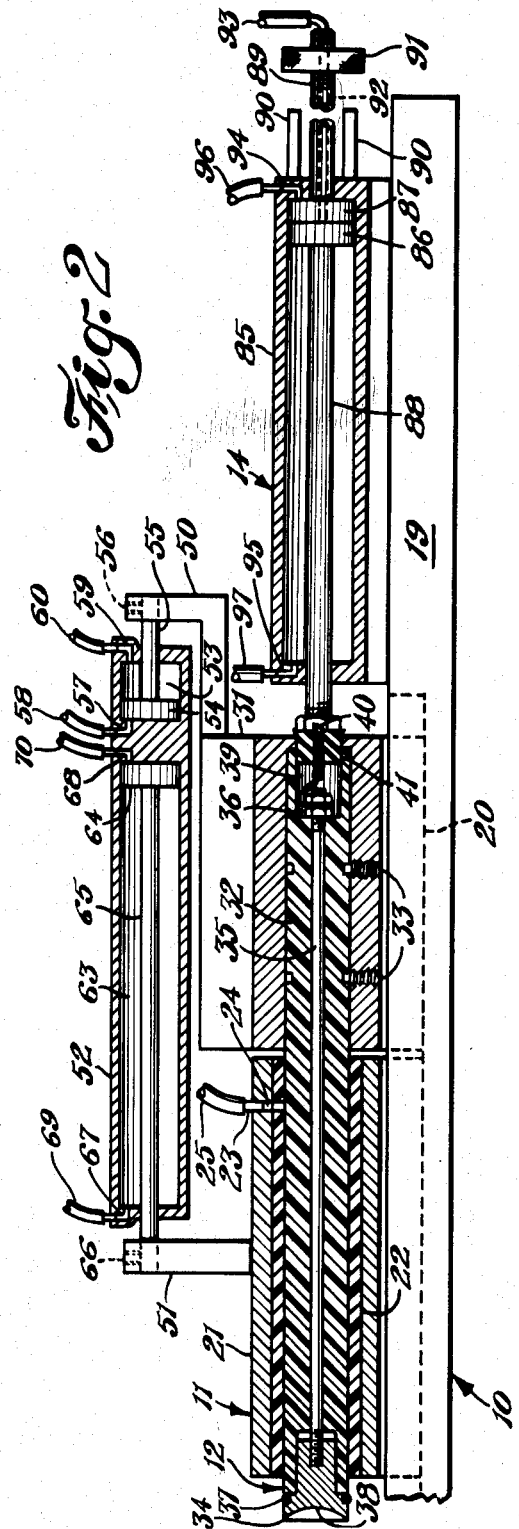

3,122,989
CONTINUOUS MANUFACTURE OF SAUSAGE
Ogden A. Clemens and Howard P. Bonheimer, Chicago, and Harvey H. Trombly, Park Forest, Ill., assignors to Swift & Company, Chicago, Ill., a corporation of Illinois
Original application Mar. 11, 1957, Ser. No. 645,221, now Patent No. 2,965,491. Divided and this application May 20, 1960, Ser. No. 41,463
6 Claims. (Cl. 99—358)

The present invention relates to an apparatus for manufacturing sausages or the like.

This application is a division of our earlier co-pending U.S. patent application S.N. 645,221, which was filed March 11, 1957, and is now Patent No. 2,965,491.

In the last few years there has been developed a new method and apparatus for the manufacture of sausages or the like. In this process the comminuted sausage mix in a fluid or semi-fluid form is inserted into a fixed mold. An alternating electric current is passed through the mix whereupon the mix is set up into a solid, self-sustaining, form in a matter of seconds. After reaching that form the mix may be ejected from the mold into a suitable holder or carrier for further cooking and smoking carried out generally in accordance with the conventional practices that have been followed for many years. This process differs principally from the prior art in the immediate setting up of the mix into a self-sustaining form in a matter of seconds in a fixed mold which enables the dispensing of the conventional steps of stuffing a flexible casing in which the mix remains for all of its processing. Further details of the process will be found in U.S. Patent No. 2,685,518 and the presently pending application Serial No. 381,956, now Patent No. 2,877,118.

One of the principal problems that has been encountered in the practice of the process described in the preceding paragraph is that of producing a product which has the appearance of a sausage manufactured by the historical conventional process. In order not to encounter consumer resistance to the product produced by this process and to avoid having to introduce the product on the market as a new product rather than as being the historically made product, it is deemed necessary to have the product produced by this process resemble that of the prior art in appearance, taste, texture, etc. For example, products produced using a conventional frankfurter emulsion should be substantially indistinguishable from conventional frankfurters when finished. The process described above has enabled one to produce a product having the texture and flavor of the prior art products. Such differences as may exist are actually in qualities in respect to which the consumer actually prefers the new product over that of the prior art so that if anything the new product is preferable to that of the prior art. However, some difficulties have been encountered in matching the appearance of the product with that of the prior art. These difficulties include maintaining relatively uniform length of product, having a smooth outer surface on the product and having the ends rounded with approximately equal curvature on each end. The principal object of the present invention is to provide a method and apparatus that will enable one to more nearly achieve these characteristics of appearance when practicing the process outlined above.

Another object of the present invention is to provide a simplified apparatus for manufacturing such sausages and particularly to provide such an apparatus in which a more equal control of weight may be maintained. For example, when producing frankfurters it is desirable to have a given number, e.g. 10, of the frankfurters weigh a given amount, e.g. a pound. While the apparatus disclosed in the above-identified application will enable the manufacturer of frankfurters to come much closer to producing all frankfurters of say 1.6 ounces than will the prior art practices of filling a flexible casing; still, with that apparatus some variation in weight may occur. For example, changing the constituents of the emulsion used in the manufacture of the frankfurter may affect the weight of the end product. Furthermore, the means of controlling the volume of the space in the mold cavity was such as to present some possible error in the weight. We have devised an apparatus in which not only will the space within the molding cavity be exactly the same time after time, but it may be readily changed with vernier accuracy to compensate for changes in the constituents of the frankfurter emulsion. This is a great advantage to a frankfurter manufacturer who wishes to not produce underweight packages because the purchaser would thereby not be getting what was allegedly being sold him, and at the same time desires not to produce overweight packages because each amount that the package was over the identified weight would be a "gift" of product by the manufacturer. While such "gifts" might be small when considering a pound of frankfurters, the cumulative effect when dealing with millions of pounds of frankfurters becomes substantial.

Other objects and advantages will become apparent from the following description taken in conjunction with the drawings in which:

FIGURE 1 is a schematic illustration of an embodiment of the invention;

FIGURE 2 is an enlarged plan view, in cross section, of the mold and movable electrode;

FIGURE 3 is an enlarged plan view, in cross section, of the fixed electrode and feed control valve;

FIGURE 4 is an enlarged section taken at line 4—4 of FIGURE 3; and

Figure 5:
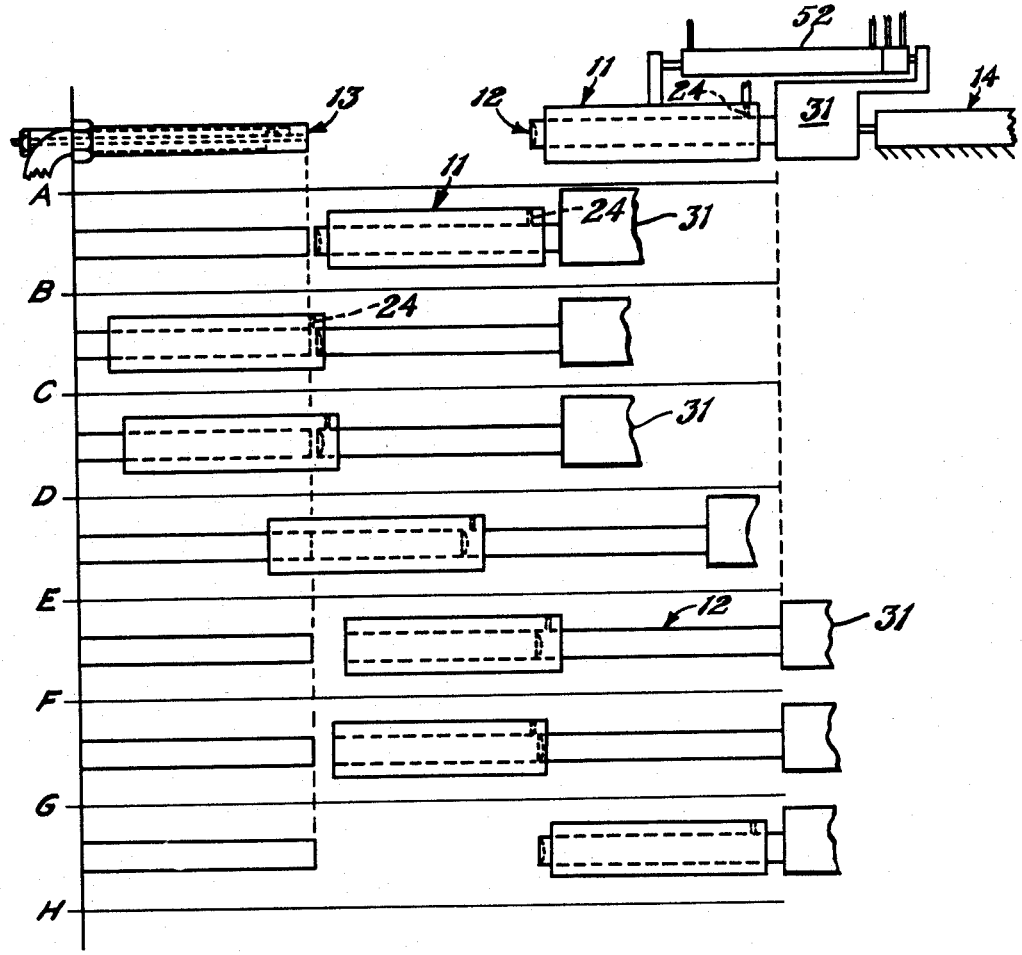
FIGURE 5 is a cycling chart showing the sequential movements of the mold and movable electrode.

We have discovered that an important factor in controlling the appearance of the sausage manufactured by a machine such as that described is the necessity for removing as much as possible of the air from the molding cavity before the sausage mix is introduced into that cavity. The reason for this is not known. However, when it is not done there is a substantial growth in length of the sausages after they are set up and removed from their molding cavity and during the time that the further cooking and smoking of the sausages takes place, accompanied by a decrease in diameter. There will be a substantial variance in the amount of this growth from sausage to sausage so that there will be a readily apparent unevenness in the size of the sausages. While vacuumizing the molding cavity does not completely eliminate this growth characteristic of the sausages, it does very substantially reduce it. Furthermore, the sausages are of all about the same length and diameter after the cooking and smoking is completed. This evacuation of the mold chamber also affects the surface appearance of the sausages. A surface smoothness comparable to that of sausages made in casings is achieved as compared with a pebbly surface appearance that is usually obtained when the mold cavity is not evacuated.

A further step in the operation of such a device that we have devised is to positively fix the size of the mold cavity. As the electric current is passed through the sausage mix to set up that mix the heating of the product tends to expand the product and create pressure in the mold. This expansion pressure with the previously described apparatus would move the movable electrode against the resistance of the air cylinder that had positioned it. There were those that believed that relieving this pressure by allowing this movement was desirable.

However, to the contrary, we have found that holding the movable electrode fixed is advantageous in the sausage manufacture. Not only does the pressure that is created (which ranges up to about 800 pounds per square inch in the manufacture of frankfurters of conventional size) speed the cooking process, but it appears also to be a factor in improving the appearance of the product. While the fixing of the position of the movable electrode during the cooking process might be done in a number of ways, we prefer, as will be hereinafter apparent in connection with the described embodiment, to use oil to operate the hydraulic cylinder connected to the movable piston. The oil will have sufficient incompressibility to prevent the pressure of the heated material in the mold from moving the movable piston.

Upon the completion of the cooking process the electrodes must be moved apart to relieve the pressure before any effort is made to move the mold from about the sausages when the sausage is formed. If this is not done the appearance of the product will be damaged.

In carrying the process of manufacture with such an apparatus it has been found that the use of a flat electrode at the end at which the sausage mix is introduced into the mold is satisfactory provided the fibers of the product are disoriented immediately adjacent the point at which they are introduced into the mold cavity. The flow of sausage fibers into the mold is in such a direction that there is some reorientation immediately at the end of the sausage. While this sausage has a flat end at the time that it is ejected from the forming machine, these partially oriented fibers at the end change the shape of the end as the further processing, i.e. cooking, proceeds. By the time that the cooking is completed the end has a rounded appearance. However, we have discovered that the opposite end, that is the end at which no product is being introduced, must be formed in a curved shape so as to achieve the desired configuration and to result in a sausage having a conventional appearance. The exact curvature of the nonextrusion electrode will be such to conform to the curvature of the opposite end of the sausage after the manufacture of the sausage is completed.

In the construction of the mold and electrode, difficulty was encountered in maintaining a seal about the electrodes with the inner wall of the cavity. The preferred material for the cavity wall was polymerized tetrafluoro ethylene plastic, sold under the trademark "Teflon." When a Teflon insert was introduced into a steel mold and held in place by C rings the increase in size of the Teflon as it became heated in operation was such that the inner diameter (the size of the molding cavity) became substantially larger than it had been originally. On the other hand, the metal electrodes forming each end of the cavity expanded nowhere near as much with the result that a good seal was not maintained between the body of the electrode and the inner wall of the mold cavity. The problem became particularly acute when efforts were made to evacuate the mold cavity before the introduction of product. We have found that the problem can be solved by making the outer diameter of the Teflon insert substantially larger than a diameter that will slide into the inner opening of the metal body of the mold surrounding the Teflon insert. The Teflon insert is then introduced into the cavity by cooling it with Dry Ice to reduce its size. After cooling the insert is pressed into the cavity in the metal body to obtain a tight fit between the Teflon insert and the metal body. As the Teflon is subsequently heated the inner diameter of the cavity not only does not increase but actually becomes smaller so that a better fit is obtained with the electrode bodies after the machine has been warmed up than is obtained when the machine is cooled. In addition, we prefer to use synthetic rubber sealing rings to reduce and absorb the wear as hereinafter described in connection with the specific embodiment.

The illustrated embodiment includes a frame generally 10, a mold generally 11, a moving electrode and mounting means therefor generally 12, a fixed electrode and mounting means therefor generally 13, a power means generally 14 for the mold 11 and movable electrode 12, and a control means generally 15.

The frame 10 comprises a mounting plate 19 having ways 20 therein. Mounted in ways 20 is the steel body member 21 of mold 11. The molding cavity of mold 11 is defined by the inner opening of a plastic liner 22 in body member 21. Preferably this plastic is polymerized tetrafluoro ethylene, sold under the trade mark "Teflon," which has been fitted into the steel body as previously described. The inner opening of liner 22 forms the molding cavity and is circular in cross-section. Both ends are open so that it will slide over the movable electrode 12 as illustrated in FIGURE 2. Adjacent one end of the cavity is a pipe 23 which communicates with the interior of the mold cavity through a passageway 24 and is connected by a flexible hose 25 to an electrically actuated valve 26. Valve 26 is connected to a suitable vacuum source 27 by a pipe 28.

A block 31 is also mounted in ways 20 and forms a portion of the mounting means of electrode 12. A plastic support member 32 passes substantially through block 31 and is secured thereto by set screws 33. The external diameter of support member 32 is sufficiently smaller than the interior diameter of mold liner 22 so that the support member will pass through the mold and be movable with respect thereto. A metal electrode is mounted on the projecting end of supporting member 32 and is held in place by being threaded to an axial rod 35 held at the other end by nuts 36. An O sealing ring 37 is received in a suitable seat in electrode 34. The electrode face 38 of electrode 34 is dished with the curvature being such to simulate the opposite end of the frankfurter produced by the machine after that frankfurter has been fully cooked. Face 38 is preferably a precious metal to better withstand the electrolysis action encountered during the electrical heating of the sausage mix. The face also should be nonporous. We prefer to use a gold surface. If formed from a gold bar or gold leaf the surface is quite satisfactory as produced. However, if the face is produced by electrodisposition, it must be burnished by polishing with a soft cloth or the like in order to fill the pores and improve its working life.

The opposite end of support 32 has an opening 39 within which the end of rod 35 is received and held in place by nuts 36. A wire 40 passes into this cavity through a rubber cork 41. One of nuts 36 holds the end of the wire in place on rod 35 with the rod forming an electrical conductor to electrode 34. Wire 40 connects through the contacts of a normally opened relay 42 to an electrical generator 43. The other side of generator 43 is connected by a wire 44 to ground, i.e. the frame of the machine.

The electrode support structure we have devised and which has just been described is quite important in maintaining satisfactory operation of the machine. With prior structures considerable difficulty was encountered with arcing between the conductor leading to the electrode and the adjacent metal which would be at ground potential. This arcing was aggravated by the presence of moisture that would accumulate during use. Often the arcing would be not sufficiently large to completely incapacitate the machine but at the same time would be sufficient so that adequate current was not passed through the frankfurter mix in the mold. The erratic action in producing frankfurters as a result of this problem often was troublesome yet it would be hard to find just what was causing the problem. The whole machine would practically have to be disassembled in order to find what might be the difficulty. This was particularly true where a number of the sausage forming heads were used in parallel, all connected to the same electrical generator source.

A mounting bracket 50 is attached to block 31 and a mounting bracket 51 is attached to the mold body 21. Between brackets 50 and 51 is a double fluid cylinder member 52 of power means 14. While this fluid cylinder member 52 is illustrated as a single unit, it, of course, could comprise two separate units attached together. At one end of fluid cylinder member 52 is a fluid cylinder 53 within which is a piston 54. Piston rod 55 of piston 54 is attached to bracket 50 by means of a set screw 56. At one end of cylinder 53 is a passageway 57 to which is connected a hose 58 and at the other end is a passageway 59 to which is connected a hose 60.

At the other end of cylinder member 52 is a cylinder 63 within which is a piston 64. Piston rod 65 of piston 64 is attached to bracket 51 by means of a set screw 66. Passageways 67 and 68 at opposite ends of cylinder 63 communicate with hoses 69 and 70, respectively.

Hoses 69 and 70 communicate with a four-way valve 73 moved by a solenoid 74 in one direction and against the resistance of a spring 75 which moves the valve in the opposite direction upon the de-energization of the solenoid. Air is supplied to four-way valve 73 through a pipe 76 connecting to a suitable source of air pressure 77. Similarly hoses 58 and 60 connect to a four-way valve 78 operated by solenoid 79 and spring 80. A pipe 81 connects four-way valve 78 to the source of air 77.

Power means 14 also includes a fluid cylinder 85 mounted on frame 10 within which are two separate pistons 86 and 87. Piston 86 is connected by means of its piston rod 88 to block 31. Piston 87 has a piston rod 89 projecting outside of cylinder 85 between a pair of stops 90. On the end of piston rod 89 is a stop screw 91 which is threaded onto the end of the piston rod so that it may be adjustably positioned along the piston rod. Piston rod 89 has a passageway 92 therethrough which passageway also passes through piston 87 so as to communicate with the space between the two pistons 86 and 87. Passageway 92 also communicates with a hose 93. At each end of cylinder 85 are passageways 94 and 95 connecting to hoses 96 and 97 respectively.

Referring to FIGURE 1, hose 97 connects with a flow control or throttling valve 100 and with a check valve 101. The opposite side of each of valves 100 and 101 connect to a closed oil storage tank 102. Tank 102 is only partially full of oil and the air space at the top of the tank connects by means of a pipe 103 to a four-way valve 104. Four-way valve 104 is operated by the combination of a solenoid 105 and a spring 106. A pipe 107 supplies four-way valve 104 with air from source 77. Four-way valve 104 also connects by means of a pipe 108 to the air space at the top of an oil tank 109. A pipe 110 connects the lower portion of storage tank 109 with a throttling valve 111 and a check valve 112. The other side of valves 111 and 112 connect to hose 93. A pipe 113 connects the lower part of reservoir 109 with a solenoid-actuated valve 114 which in turn is connected by means of a pipe 115 to a throttling valve 116 and a check valve 117. The opposite side of the latter two valves connect to hose 96.

Referring to FIGURES 3 and 4, the fixed electrode and mounting means 13 comprises a tube 123 having threads at one end for a union connection 124 on feed pipe 125. Pipe 125 is secured to the frame 10 and communicates with a supply pipe 126. The emulsion used in manufacture of the frankfurter is supplied from a suitable pump not shown. Such pump might take the form of a continuous stuffer illustrated in application No. 488,961, now Patent No. 2,805,444, the disclosure of which is incorporated herein by reference. Such stuffer would communicate with pipe 126. At the other end of pipe 123 is a valve and electrode body 127 which is threaded into the pipe. Valve body 127 is made of metal, for example steel, with the outer face 128 being flat and covered with a suitable precious metal as described in connection with electrode surface 38. An axial passageway 129 passes through the electrode surface 128 and also with an elongated narrow orifice 130. A valve rod 131 slides in passageway 129 and also slides in a suitable opening in a boss 132 at the rear side of pipe 125. Boss 132 is threaded to receive a packing nut 133. A connector 134 is secured to valve rod 131 and to the piston rod 135 of a double-acting air cylinder 136. Pipes 137 and 138 communicate with opposite ends of the interior of air cylinder 136 and with a four-way valve 139 (FIGURE 1). Again four-way valve 139 is operated by a spring 140 and a solenoid 141. Valve 139 is supplied with air from source 77 by means of a pipe 142. An annular seat about valve body 127 is provided for an O sealing ring 143.

A number of elements of the control means 15 have already been described in connection with the portions of the power means, etc., to which they connect. In addition, the control means 15 comprises a suitable sequential actuation determining apparatus such as the plurality of cam driven switches illustrated in FIGURE 1. Here a slow speed timing motor 150 is connected to a shaft 151 by a connector 152. Shaft 151 is suitably journaled in bearings 153 and carries a series of cams 155–161 operating switches 165–171, respectively. One side of each of switches 165–171 is connected to power supply line 175 as is motor 150. The motor is also connected to the second power supply line 176. Switch 165 is connected by a wire 177 to solenoid 141. The opposite side of solenoid 141 is connected by a wire 178 to power line 176. Switch 166 is connected by means of a wire 179 to solenoid 79. The opposite side of solenoid 79 is connected by a wire 180 to power line 176. Switch 167 is connected by a wire 181 to solenoid 74. The opposite side of solenoid 74 is connected by means of wire 180 to power line 176. Switch 168 is connected by means of a wire 182 to solenoid 105. A wire 183 connects the opposite side of solenoid 105 to power line 176. Switch 169 is connected by means of a wire 184 to a solenoid 185 of valve 114. A wire 186 connects the other side of solenoid 185 to power line 176. A wire 187 connects switch 170 with the operating coil 188 of relay 42. The opposite side of coil 188 is connected by means of wire 178 to power line 176. Switch 171 is connected by means of a wire 189 to the actuating solenoid 190 of valve 26. A wire 180 connects solenoid 190 with power line 176.

In starting up the operation of the apparatus a standard frankfurter emulsion is supplied to the fixed electrode 13 through pipe 126. Valve rod 131 is held to the left in FIGURE 3 until the passageway 129 is full at which time the valve is closed by the positioning of the four-way valve 139. Preferably the mold 11 will be prewarmed to approximately 130° F. If this is not done the initial product will not be quite the same until the mold reaches its standard operating temperature. The sequence of operation is illustrated in the successive positions A–H of FIGURE 5. These, of course, will be determined by the rotation of cams 155–161 of the control means 15.

The starting position is position A illustrated in FIGURE 5. At this time the power means 14 moving electrode 12 and mold 11 are in the positions illustrated in FIGURE 2. Initially switch 169 closes to energize solenoid 185 and open valve 14. At the same time switch 168 closes to energize solenoid 105 and reposition four-way valve 104 so that the air pressure from source 77 is applied to pipe 108. The pressure of this air is transferred to the oil in tank 109 and the oil flows through pipes 113 and 110 to hoses 96 and 93, respectively. Throttling valves 116 and 111 regulate the rate of flow of the oil. The oil coming through hose 93 enters between the two pistons 86 and 87 so as to move piston 86 to the left carrying block 31 with it. The oil from the left side of piston 86 exhausts through hose 97 and bypasses valve 101 into reservoir 102. The four-way valve 104 has exhausted pipe 103 to atmosphere at the time of the repositioning by the energizing of solenoid 105 so as to permit a free flow of this oil. The oil entering hose 96 enters the cylinder to the right of piston 87 to move that piston to the left in FIGURE 2. The extent of this movement is controlled by adjusting nut 91 contacting stops 90. At this time switch 169 opens to de-energize solenoid 185 and close valve 114, thus locking piston 87 in the position with stop nut 91 against stops 90. As block 31 moves to the left it carries with it the electrode 12 for which the block 31 forms a portion of the mounting means and mold 11 which is connected to the block 31 through mounting bracket 51, cylinder member 52 and bracket 50. At the end of this movement the electrodes and mold have reached position B illustrated in FIGURE 5.

Solenoid 79 is then energized by switch 166 to reposition valve 78 and apply air pressure from source 77 to hose 58 and move piston 54 to the right in FIGURE 2. The opposite side of cylinder 53 is exhausted to atmosphere through hose 60 and four-way valve 78. At the same time solenoid 74 was energized by switch 167 to reposition four-way valve 73 and supply air under pressure to hose 70 from pipe 76. Pipe 70 communicates with the right end of cylinder 63 so as to move piston 64 to the left in FIGURE 2. The movement of the two pistons 54 and 64 in opposite directions as just described moves mold 11 to the left to position C in FIGURE 5.

It will be noted that in position C the vacuum passageway 24 is in communication with the space between the two electrode faces 38 and 128. At this time switch 171 closes to energize solenoid 190 and open vacuum valve 26. A vacuum is then drawn on the space between the two electrode faces. Vacuum valve 26 is closed by switch 171 opening, but the sealing rings 37 and 143 hold the vacuum in the space between the two electrode faces. Switch 166 then opens to de-energize solenoid 79 and permit spring 80 to reposition four-way valve 78. Upon the repositioning of this valve air from pipe 81 is applied to hose 60, passageway 59 moving piston 54 to the left in FIGURE 2, and returning it to the position illustrated in that figure. The other side of the cylinder 53, of course, is exhausted to atmosphere through hose 58 and four-way valve 78. This movement of piston 54 shortens the distance between the two brackets 50 and 51 moving the mold 11 to the right. The mold is then in position D in FIGURE 5.

Switch 165 now closes to energize solenoid 141 repositioning four-way valve 139 so as to apply air under pressure to pipe 138 with pipe 137 being exhausted to atmosphere. This actuates cylinder 136 and moves valve rod 131 to the left to uncover the communication between orifice 130 and passageway 129. The sausage emulsion flows through orifice 130, makes a right-hand bend and enters the space between the electrode faces through passageway 129. The turning of the meat fibers upon moving angularly into and through orifice 130 and making the right-hand bend into passageway 129 achieves a disorientation of the fibers. It will be noted in FIGURE 4 that orifice 130 is smaller in width even than passageway 129.

With sufficient emulsion injected into the mold to fill the space between the electrode faces, switch 168 opens to de-energize solenoid 105 and reposition valve 104. The air under pressure from source 77 creates an oil flow from tank 102 through throttling valve 100 into the left end of cylinder 85. Piston 86 commences moving to the right in FIGURE 2 with the rate of movement being controlled by throttling valve 100. The rate is sufficiently slow so that the molding cavity between the electrode faces always remains pressurably full of sausage emulsion. The oil from the space between the two pistons 86 and 87 is exhausted through passageway 92, hose 93, and check valve 112 into tank 109. The air from tank 109 of course exhausts to atmosphere through pipe 103 and valve 104. It is important to note that the repositioning of valve 104 did not affect piston 87 inasmuch as the oil to the right of that piston was unable to move since valve 114 had previously closed.

The molding cavity continues to increase in size by the movement of piston 86 until that piston contacts piston 87. Since piston 87 is locked in place by the closing of valve 114, the distance between the two electrode faces 38 and 128 is accurately determined by the position of piston 87. As previously mentioned this position of piston 87 may be variably set by the moving of adjusting wheel 91 on piston rod 89. At the conclusion of the movement of piston 86 the movable electrode and mold have assumed position E in FIGURE 5.

The electric current is then passed through the emulsion between the two electrode faces 38 and 128 by the closing of switch 170 which energizes coil 188 of relay 42 and connects the electrical source 43 in series with the electrodes and emulsion. After the proper period of time which can be determined by trial and error in a particular instance and will vary with the amount of power employed, the make-up of the emulsion, etc., but normally will be a matter of seconds, relay 42 is de-energized to disconnect power source 43 from electrode face 38. During this period of time the parts were locked at position E of FIGURE 5. The heating of the emulsion will develop very substantial pressures within the mold cavity. However, these pressures are effectively resisted by the locking of the movable electrode in place by the use of hydraulic fluid and the closing of valve 114.

After cooking is completed it is important that the pressure in the mold cavity be relieved before endeavoring to remove the mold from about the set-up sausage mix. If this is not done, damage to the sausage will result. Pressure relief is achieved by valve 114 opening sufficiently long to permit the fluid from tank 102 to push piston 86 and piston 87 all the way to the right in FIGURE 2. Valve 114 of course is opened by the closing of switch 169 which need remain closed only for a brief period of time for the oil from the right-hand end of cylinder 85 to flow through hose 96, check valve 117, valve 114 and pipe 113 into reservoir 109. At the end of this time the movable electrode 12 and the mold 11 will have assumed the position F illustrated in FIGURE 5.

Before attempting to eject the sausage from the mold it is desirable to break any adhesion between the set-up sausage and electrode face 38. This is done by closing switch 166 to reposition four-way valve 78 to move piston 54 as previously described in connection with a previous repositioning of four-way valve 78. Mold 11 is moved to the left to the position G in FIGURE 5. The movement of the mold will move the set-up sausage in the mold cavity sufficiently to break any adhesion that may have occurred between the end of the set-up sausage and electrode face 38.

Solenoid 79 is then de-energized by opening switch 166 and solenoid 174 is also de-energized by opening switch 167. In response to the de-energizing of these solenoids valves 78 and 73 are repositioned by springs 80 and 75, respectively. The fluid pressure is reversed in the ends of cylinders 53 and 63 so as to return the two pistons 54 and 64 to the positions illustrated in FIGURE 2. At the end of this movement the mold assumes the position illustrated at H in FIGURE 5 which is the same as the starting position A. During the course of this movement the set-up sausage will be ejected from the mold 11 by the movement of that mold back around electrode 12. The ejected sausage is then conveyed, as in standard production techniques through a suitable oven for the completion of the processing. Obviously other means than a conveyor may be employed if desired.

Normally in manufacturing frankfurters in the quantities produced by most meat packers a number of the forming units will be ganged and used in connection with a single conveyor onto which the set-up sausages are deposited. In such a case the control means 15 may serve a number of forming machines each comprising a mold 11, movable electrode 12, fixed electrode 13 and power means 14. The advantage of the described embodiment over the prior art is in the simplicity of controls. For an example, in an eight-head forming unit the present embodiment eliminates six valves of the eight employed by the prior embodiment, and eliminates 16 snap-action switches used to control the movements. In so doing greater accuracy has been achieved. The control wheel 91 serves as a micrometer and can very finely adjust the length to which the sausage is being produced. Such an exact setting of the operation of a snap-action switch cannot be achieved. If the product from one molding head is running a little over or a little under weight, a simple adjustment of wheel 91 will correct the size of the molding cavity and thus the weight to which the product is manufactured. Obviously the setting of wheel 91 can be calibrated in terms of weight, if desired, when using a relatively stable composition emulsion.

The foregoing detailed description is only for clearness of understanding and for the purpose of complying with 35 U.S.C. 112 and we do not desire to be limited to the exact details of construction shown and described for obvious modifications will occur to a person skilled in the art. An example of one such modification that would be within the scope of the present invention would be the changing of the cross-section of the mold cavity.

We claim:

1. A device for molding a comminuted meat containing product into the form of sausage or the like, said device comprising a mold having a molding cavity of a predetermined cross section and open at opposite ends, a pair of electrodes and mounting means therefor having an exterior configuration corresponding to that and only slightly smaller than that of said cross section, said electrodes being positioned at opposite ends of said mold in alignment with said cavity, said mold having a vacuum passageway opening through the wall of said cavity adjacent one end of the cavity, power means connected to said mold and to said mounting means to sequentially move at least one of said electrodes to bring said electrodes substantially together within said cavity with the space between said electrodes in communication with said passageway, and thereafter to move said space and said passageway out of communication with each other, to flow product into said space while moving the electrodes apart to increase the distance between the electrodes until said distance reaches a predetermined dimension, to pass an electric current between said electrodes to set up said product into the shape of the cavity between said electrodes, to move one of said electrodes out of said cavity, and to move the other of said electrodes through the cavity to eject said set up product.

2. An improved apparatus for molding sausages or the like from a comminuted meat containing mixture, said apparatus comprising a mold member having an elongated molding cavity therein, said mold member being movable along a given path longitudinally of said cavity, a first electrode insertable within said cavity along said path, a second electrode normally spaced from said first electrode substantially along said path and similarly insertable within said cavity, at least one of said electrodes being movable with respect to the other substantially along said path from said normally spaced position, sausage mixture supplying means communicating with said cavity, a first actuating means connected to move said one movable electrode sequentially through three essentially fixed positions along said path, said actuating means comprising two members arranged serially so that their movement is cumulative, one of said members having an adjustable movement whereby the intermediate of said three positions can be adjusted to finely regulate the distance between said electrodes and hence to regulate the length of a sausage molded at said intermediate position while thereafter providing further expansion of the mold to release pressure therein; a second actuating means connected to independently move said mold member between three positions along said path with respect to said one movable electrode, said actuating means comprising two oppositely acting members arranged serially, and control means for sequentially operating said apparatus, including said first and second actuating means, to: bring said electrodes closely together within said one end of said mold cavity; separate said electrodes within said cavity and fill the space therebetween with said mixture; set up said mixture within said cavity; thereafter separate said mold member and one electrode from the other electrode; then move the mold away from said one electrode; and finally telescope said mold cavity upon one of said electrodes to thereby eject the set-up sausage mixture therefrom.

3. The improved apparatus of claim 2 wherein the first actuating means is a hydraulic member consisting of two oppositely acting pistons, one piston having an adjustable stroke, and the second actuating means consisting of a pneumatic member having two oppositely acting pistons.

4. The improved apparatus of claim 3 including a passageway in said mold member communicating with one end of said cavity, and a vacuum means connected to said passageway to withdraw air from said cavity at a time that said first and second electrodes are in closest proximity and within said one end of said cavity.

5. An improved apparatus for molding sausages or the like from a comminuted meat containing mixture, said apparatus comprising a first tubular member having a first electrode face at one end thereof, said tubular member containing an internal passage for the expelling of said mixture through an opening in said first electrode face, a second tubular member normally spaced from said first member and aligned therewith, said second tubular member having a second electrode face and being mounted for reciprocal movement toward said first electrode, a mold member containing an elongated molding cavity of sufficient size to receive said electrode faces therein, said mold member being mounted for reciprocal movement in alignment with said tubular members and normally positioned telescopically upon said second tubular member with an end thereof directed toward said first tubular member, a passageway in the opposite end of said mold member connecting one end of said cavity to a source of vacuum, a first actuating means connected to both said second tubular member and said mold member operable to move them to a position closely proximate said first electrode face and to an intermediate position between the latter position and said normally spaced position, said actuating means consisting of two sections one of which is adjustable to regulate said intermediate positions, and a second actuating means connected to said mold member to move it independently of said second tubular member through an extended position telescoped upon said first tubular member with said passageway positioned between said first and said second tubular members and at least two withdrawn positions with said passageway upon said second tubular member, one of said withdrawn positions being said normal position.

6. A device for molding a comminuted meat-containing product into the form of sausage or the like, said device comprising a tubular mold member, a vacuum passageway located in the wall of said mold member adjacent one end thereof, a pair of end members positioned in line with said tubular mold member at opposite ends thereof, said mold member being of a size to telescopically slide upon both of said end members, first power means to sequentially move one end member in the direction of the other end member into a closely spaced relation and in the reverse direction apart from said other end member, second power means to move said mold member with respect to said one end member to slide upon both end members and to first position said vacuum passageway between said end members and thereafter to slide the passageway upon one of said end members while said members are in said closely spaced relation, and means to inject sausage emulsion into said mold member between said end members as said members are moved apart.

References Cited in the file of this patent

UNITED STATES PATENTS

| | | |
|---|---|---|
| 2,373,226 | Coates | Apr. 10, 1945 |
| 2,484,603 | Audemar et al. | Oct. 11, 1949 |
| 2,668,985 | Babbit | Feb. 16, 1954 |
| 2,690,589 | Moses | Oct. 5, 1954 |
| 2,877,118 | Hensgen et al. | Mar. 10, 1959 |
| 2,879,593 | Schwartz | Mar. 31, 1959 |